United States Patent [19]
Heinzelmann

[11] Patent Number: 4,736,220
[45] Date of Patent: Apr. 5, 1988

[54] ATTENTION DIVERTER FOR CAMERA

[76] Inventor: Elizabeth M. Heinzelmann, 3708 Summitridge Dr., Atlanta, Ga. 30340

[21] Appl. No.: 43,878

[22] Filed: Apr. 29, 1987

[51] Int. Cl.$^4$ ........................................... G03B 11/00
[52] U.S. Cl. ..................................... 354/295; D16/38; 446/387
[58] Field of Search ................... 354/75, 76, 295, 288; D16/38; D21/160, 166; 446/387, 388, 385, 488

[56] References Cited

U.S. PATENT DOCUMENTS 266,035 10/1882 Higgins .................................. 354/75
4,072,973 2/1978 Mayo ................................... 354/295

Primary Examiner—L. T. Hix
Assistant Examiner—Brian W. Brown
Attorney, Agent, or Firm—James B. Middleton

[57] ABSTRACT

An attention diverter is mountable on a 35 mm or similar camera and is sufficiently mobile to be carried on the camera while taking pictures. The attention diverter is in the form of a fanciful person or animal and has a body mounted over the prism housing, and legs span the lens. Movement may be provided by making the legs in accordion style so there will be motion as the device is moved. A head extends up from the body, in the form of a board, and googly eyes or the like can be added for further motion. The specific design can be easily varied to attract the attention of the particular age group being photographed.

9 Claims, 1 Drawing Sheet

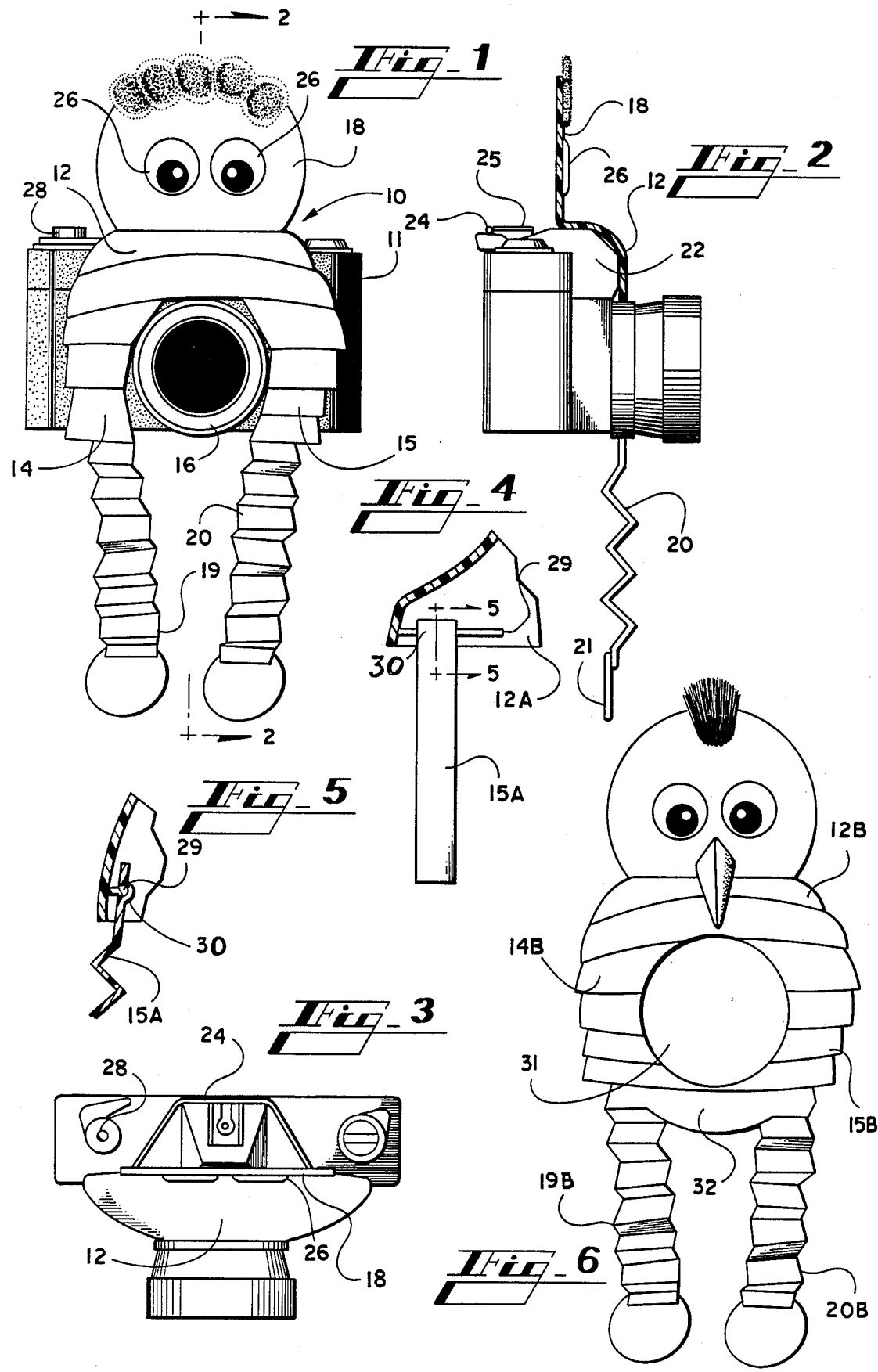

4,736,220

ATTENTION DIVERTER FOR CAMERA

INFORMATION DISCLOSURE STATEMENT

For many years it has been common in photography for the photographer to attempt to divert the attention of the subject in order to achieve the desired pose and expression. There have commonly been provided, in a studio, various objects which a person is directed to look at to achieve the desired attention and pose.

U.S. Pat. No. 266,035 discloses and attachment for a camera, the attachment comprising a rotating drum having a picture or the like to direct attention during the taking of a photograph.

With the smaller and more mobile cameras frequently utilized today, a fixed "birdie" or the like within a studio, or an elaborate attachment such as that disclosed in U.S. Pat. No. 226,035, is of little use. A camera utilizing film in the vicinity of 35 mm or 2.25 inches or the like is sufficiently small and mobile that a photographer will frequently take pictures of a person while the photographers move relatively rapidly around a room, or even the outdoors. This is especially true in photographing relatively small children who may be either uninterested in the camera, or afraid of the camera.

SUMMARY OF THE INVENTION

This invention relates generally to attention diverting apparatus, and is more particularly concerned with a camera-mounted attention diverter for easily mobile cameras.

The present invention provides an attention diverter to be carried by a camera, the attention diverter preferably spanning the lens of the camera so that a person looking at the attention diverter will be looking generally towards the camera. The device of the present invention is receivable on the camera, and is temporarily held with respect to the camera without interfering with the needed manipulation of the camera for taking pictures. The attention diverter may be formed as a cartoon or humorous character, an image familiar to the child being photographed, or other attractive image, and may include movable portions for assisting in attracting the attention of a small infant.

BRIEF DESCRIPTION OF THE DRAWINGS

These and other features and advantages of the present invention will become apparent from consideration of the following specification when taken in conjunction with the accompanying drawings in which:

FIG. 1 is a front elevational view of an attention diverting device made in accordance with the present invention, the device being mounted on a camera;

FIG. 2 is a cross-sectional view taken substantially along the line 2—2 in FIG. 1, showing the camera in full;

FIG. 3 is a top plan view of the device illustrated in FIG. 1;

FIG. 4 is a fragmentary, rear elevational view showing a modification of the device shown in FIG. 1;

FIG. 5 is a cross-sectional view taken substantially along the line 5—5 in FIG. 4; and, FIG. 6 is a front elevational view of a modified form of attention diverting device made in accordance with the present invention.

DETAILED DESCRIPTION OF THE EMBODIMENTS

Referring now more particularly to the drawings, and to those embodiments of the invention here presented by way of illustration, FIG. 1 shows an attention diverting device generally designated at 10 supported by a camera generally designated at 11. For convenience in the description, the embodiments of the invention shown in the drawings are adapted for use with a camera such as a 35 mm, single lens reflex camera. It will be obvious to those skilled in the art that the device is readily modifiable for use with larger or smaller cameras, and for use with twin lens reflex cameras or range finder cameras if desired. The equivalents of the various portions of the cameras will be apparent to those skilled in the art.

Considering the embodiments of the invention in more detail, it will be seen that the attention diverter 10 includes a saddle portion 12 which is astride the upper, central portion of the camera 11. The saddle portion 12 has depending portions 14 and 15 extending therefrom. In the embodiment of the invention shown in FIG. 1, it will be seen that the depending portions 14 and 15 are formed integrally with the saddle portion 12, and extend on opposite sides of the lens 16 of the camera 11.

Extending upwardly from the saddle portion 12, there is a picture board 18. The picture board 18 is preferably fixed to the saddle portion 12 and supported thereby, and extends generally vertically, upwardly from the camera 11. The picture board 18 may include virtually any visually attractive material for diverting the attention of a photographic subject.

In the embodiment of the invention shown in FIGS. 1 and 2, the attention diverter 10 also includes movable portions 19 and 20. While the movable portions 19 and 20 are optional, in the event a very small child is being photographed, something that moves spontaneously tends to be a more succesful attention diverter, and further may amuse the child sufficiently to obtain more desirable photographs.

Looking at FIG. 2 of the drawings, it will be seen that the movable portions 19 and 20 are here provided by menas of accordian-folded sheet material having a weight 21 at the lower end thereof. With this arrangement it will be understood that a slight jiggling of the camera will set the movable means 19 and 20 into motion; and, any further motion of the camera will add energy to the motion of the movable means. It will be understood that the motion of the accordian folded movable means 19 and 20 will tend to follow the damped vibration curve, but additional motion will add energy so that, during a shooting session and movable means 19 and 20 might remain in virtually constant motion.

Looking further at FIG. 2 of the drawings, it will be seen that the saddle area 12 of the attention diverting device 10 is formed as a concave member, the concavity being adapted to receive the prism housing 22 of the camera 11. Since the saddle area 12 is disposed on the prism housing 22, the attention diverting device 10 will remain in place. To maintain the attention diverting device 10 on the prism housing 22, it is contemplated that a strap 24 will be passed around the flash shoe 25 or other appropriate portion of the camera for urging the attention diverting device 10 rearwardly with respect to the camera.

Looking again at FIG. 1 of the drawings, it will be noted that the attention diverting device 10 is in the general form of a fanciful representation of a person or animal. Utilizing such a representation, it would be understood that the movable means 19 and 20 may be in the form of legs of the creature, while the weights 21 are the feet. Also, the picture board 18 can be in the form of a head with various features to attract attention. For example, one might utilize eyes 26 of the well known type having movable buttons within a transparent envelope so that the eyes 26 will constitute additional movable portions for attracting the attention of a small child. Other features may be added as desired, and of course the entire device 10 may include merely geometric shapes, fantastic creatures such as ghosts and goblins, or other material to attract attention.

The apparatus shown in FIGS. 1 and 2 is arranged so that the attention diverting device 10 can be made for a generally conventional camera to be usable on various cameras having the general size and shape. It will be seen that the saddle portion 12 is easily supported on the prism housing 22 while leaving the film winding lever 28 unobstructed. It may be desirable, however, to arrange the attention diverting device 10 to be utilized with a wide variety of cameras.

One means for additional variation is to allow horizontal translation of the depending members 14 and 15 with respect to the saddle portion 12. Apparatus to allow the horizontal adjustment is shown in FIGS. 4 and 5, the saddle portion being designated at 12A, and the depending portion being designated at 15A. In FIG. 4 it will be seen that the saddle portion 12A is fragmentarily shown, but the shape of the saddle portion 12A will be generally the same as the saddle portion 12 so that the saddle portion 12A is receivable over the prism housing 22 of a conventional single lens reflex camera. Instead of having the depending portion 15 formed integrally with the saddle portion 12, the saddle portion 12A includes a rib 29 for slidably receiving depending portion 15A. As is shown in FIG. 5 of the drawings, the rib 29 is receivable within a clamp 30 on the depending portion 15A. The material is illustrated as being formed of a plastic material, and it will be understood that the clamp portion 30 and rib 29 can be formed such that the depending portion 15A can be snapped off the rib 29 so that the attention diverting device can be used without depending portions if desired. If the depending portions are used, they may be placed at any desired portion along the length of the rib 29. Thus, the positioning of the depending portions 14 and 15 might accomodate different sizes of lenses, different camera designs, or simply individual whims of the photographer.

Finally, looking at FIG. 6 of the drawings, another embodiment of the invention is disclosed. In FIG. 6 the saddle portion is designated at 12B, and the depending portions are formed integrally with the saddle portion 12B and are designated at 14B and 15B. Instead of completely independent depending portions 14 and 15, the depending portions 14B and 15B define an opening 31 for receiving the lens therethrough, and the depending portions 14B and 15B are connected below the lens at 32. The portion 32 may then include further extensions of the depending portions, and may include movable means designated at 19B and 20B.

Again, those skilled in the art will realize that the embodiment of the invention illustrated in FIG. 6 of the drawings is peculiarly adapted for use with a single lens reflex camera; however, the device could be adapted for use with a twin lens reflex camera by providing two holes such as the hole 31, or rendering the one hole sufficiently elongated for the two lenses of the twin lens camera. Also, the size of the hole 31 may be varied considerably for appropriate adaptation to the camera to be used.

The present invention therefore provides an attention diverting device that can be quickly and easily secured to a small, easily mobile camera. Once the attention diverting device is secured to the camera, the camera is freely movable and easily usable without interference from the attention diverting device. The film winding lever is free of obstruction from the device, and the lens of the camera extends sufficiently through the attention diverting device that the focusing ring is easily manipulable. The basic structure of the attention diverting device imposes few limitations so that virtually any form of artwork can be utilized, allowing the artwork to be adapted to the particular subjects to be photographed.

It will therefore be understood by those skilled in the art that the particular embodiments of the invention here presented are by way of illustration only and are meant to be in no way restrictive; therefore, numerous changes and modifications may be made, and the full use of equivalents resorted to, without departing from the spirit or scope of the invention as outlined in the appended claims.

I claim:

1. An attention diverting device for being received on a camera, said attention diverting device comprising a saddle portion receivable on the camera generally at the top of the camera and above the lens of the camera, means for selectively fixing said saddle portion to the camera, and a picture board, said picture board extending upwardly from said saddle portion and having a picture thereon, and further including depending portions carried by said saddle portion and depending therefrom, said depending portions being located at each side of the lens of the camera so that said saddle portion is generally above the lens, and the depending portions are at each side of the lens.

2. An attention diverting device as claimed in claim 1, and further including movable portions for assisting in attracting attention of infants.

3. An attention diverting device as claimed in claim 2, said movable portions being carried by said depending portions and including stretchable portions, and weights carried at the end of said stretchable portions.

4. An attention diverting device as claimed in claim 3, said attention diverting device being generally in the form of an animal or the like, said picture board constituting a head image, said depending portions constituting leg images, said head further including additional movable means.

5. An attention diverting device for being received on a camera, said attention diverting device comprising a saddle portion receivable on the camera generally at the top of the camera and above the lens of the camera, means for selectively fixing said saddle portion to the camera, and depending portions carried by said saddle portion and depending therefrom, said depending portions being located at each side of the lens of the camera so that said saddle portion is generally above the lens, and the depending portions are at each side of the lens.

6. An attention diverting device as claimed in claim 5, and further including movable portions for assisting in attracting attention of infants.

7. An attention diverting device as claimed in claim 6, said movable portions being carried by said depending portions and including stretchable portions, and weights carried at the end of said stretchable portions.

8. An attention diverting device as claimed in claim 7, and further including a picture board, said picture board extending upwardly from said saddle portion and having a picture thereon.

9. An attention diverting device as claimed in claim 8, said attention diverting device being generally in the form of an animal or the like, said picture board constituting a head image, said depending portions constituting leg images, said head further including additional movable means.

* * * * *